A. Manning.
Masts and Spars.
No. 54,379.  Patented May 1, 1866.

Witnesses:
R. Fitzgerald.
Lewis Elliott Jr.

Inventor:
his
Alfred X Manning
mark.

UNITED STATES PATENT OFFICE.

ALFRED MANNING, OF FAIR HAVEN, CONNECTICUT.

IMPROVED JAW FOR BOOMS AND GAFFS OF VESSELS.

Specification forming part of Letters Patent No. 54,379, dated May 1, 1866.

*To all whom it may concern:*

Be it known that I, ALFRED MANNING, of Fair Haven, in the county of New Haven and State of Connecticut, have invented a new and useful Improvement in Jaws for Booms or Gaffs for Vessels; and I do hereby declare that the following is a full, clear, and exact description of the construction, character, and operation of the same, reference being had to the accompanying drawings, which make part of this specification, in which—

Figure 1:
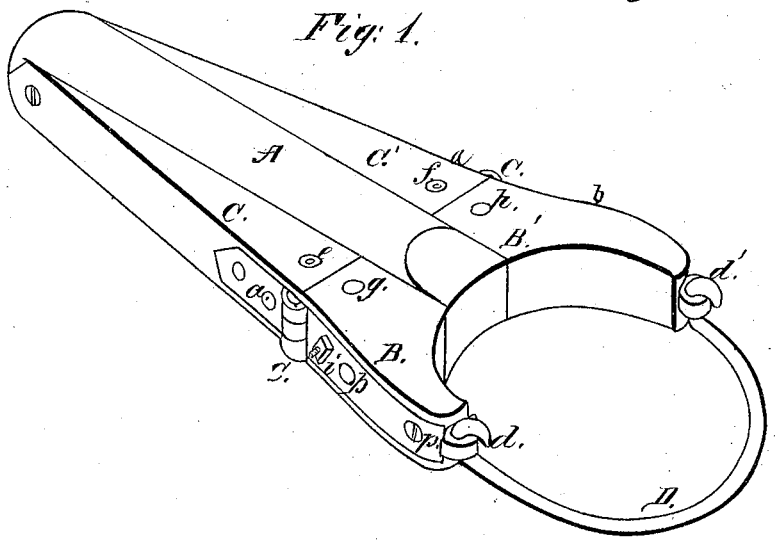
Figure 2:
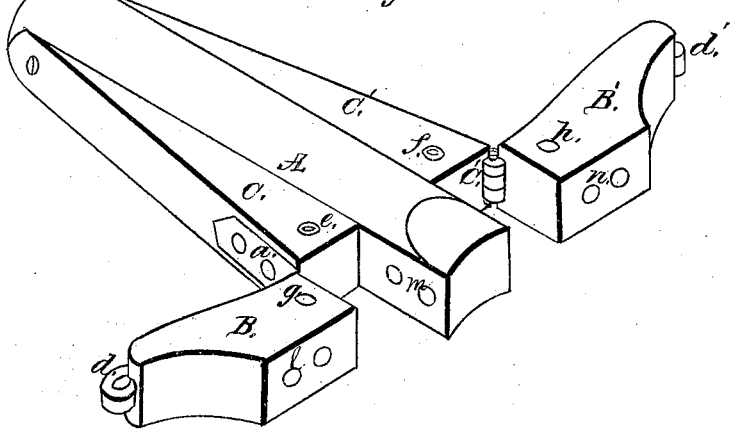

Figure 1 is a perspective view of a portion of a boom or gaff with the jaws attached, showing the whole in the position in which it will appear when ready for use. Fig. 2 is a perspective view of the same, with the two bolts removed and the jaws swung open, as when repairs, &c., are necessary.

My improvement consists in making each of the jaws in two pieces, and hanging the two pieces, secured together with iron hinges or joints, so that the parts which form the jaws proper may be readily removed and replaced whenever they, or either of them, get worn or injured, without disturbing the main or longest parts of the jaws, so that the bolts which hold them are never loosened. I make the boom or gaff in the usual way, as shown at A, Figs. 1 and 2. I make each of the jaws in two pieces, as seen at B and C and B' and C', and bolt the parts C and C' to the boom or gaff in the usual way, except that I pass two of the bolts through the iron strap on each side, which forms one part of the hinge or joint, as shown at $a$, Figs. 1 and 2, for the purpose of securing that part of the joint or hinge to that stationary part of the jaw. I make each of the other parts, B and B', of the proper shape and length, substantially as shown in the drawings, so as to fit in their places, as shown in Fig. 1. I make the two hinges or joints of wrought-iron or any other suitable material, of substantially the shape or form shown at $a$ and $b$, Fig. 1, with the moving joints, as shown at $c$ and $c'$, and I make an eye at the end of each, as shown at $d$ and $d'$, into which I hook the bail or jaw-band D, as shown in Fig. 1.

Having made the parts of the jaws and attached the parts C and C' to the boom, as before described, I put rivets or bolts vertically through each of the four parts, as shown at $e, f, g$, and $h$, if thought necessary, to secure the ends against splitting, &c. I then secure the other parts, B and B', of the jaws to the vibrating parts of the hinges by inserting two screw-bolts or rivets, as shown at $i$, Fig. 1, and indicated by the holes at $l$, $m$, and $n$, Fig. 2, and by inserting a screw near the end of each, as shown at $p$, Fig. 1, to steady that end of the hinge; and when on the mast I put the bail or jaw-band D in its place, when all will appear as in Fig. 1.

If either of the parts B or B' of the jaws, on which all the wear comes, should get worn or otherwise injured, I have only to take out the screws, as $p$, and the two bolts, as shown at $i$, Fig. 1, when the parts B and B' will swing out, as shown in Fig. 2, when a new part can be substituted for the injured one without damage to the other parts, or any loosening of the bolts or rivets which secure the parts C and C', thus saving a considerable amount of labor and timber, as well as avoiding all danger of injuring the other parts, and can be effected where a full-length jaw could not well be supplied.

What I claim as my invention, and desire to secure by Letters Patent, is—

The combination of the iron hinges with the jaws, when each jaw is made in two parts and the whole is constructed, arranged, and fitted for use substantially as herein described and set forth.

his
ALFRED × MANNING.
mark.

Witnesses:
R. FITZGERALD,
LEWIS ELLIOTT, Jr.